United States Patent
Grabmaier et al.

(10) Patent No.: US 7,464,779 B2
(45) Date of Patent: Dec. 16, 2008

(54) ALL-WHEEL DRIVE MOTOR VEHICLE

(75) Inventors: Norbert Grabmaier, Unterneukirchen (DE); Kurt Helf, Riedering (DE)

(73) Assignee: Krauss-Maffei Wegmann GmbH & Co. KG (DE)

( * ) Notice: Subject to any disclaimer, the term of this patent is extended or adjusted under 35 U.S.C. 154(b) by 78 days.

(21) Appl. No.: 11/413,134

(22) Filed: Apr. 27, 2006

(65) Prior Publication Data

US 2006/0243512 A1    Nov. 2, 2006

(30) Foreign Application Priority Data

Apr. 27, 2005    (DE) .................. 10 2005 019 489

(51) Int. Cl.
*B60K 1/00*    (2006.01)
(52) U.S. Cl. .................. 180/65.2; 180/308; 180/248
(58) Field of Classification Search ............... 180/65.8, 180/65.2, 65.6, 65.7, 65.1, 308, 197, 248; 318/400.12, 721, 139
See application file for complete search history.

(56) References Cited

U.S. PATENT DOCUMENTS

| | | | | |
|---|---|---|---|---|
| 3,297,926 A | * | 1/1967 | Campbell et al. ...... | 318/400.12 |
| 3,799,284 A | * | 3/1974 | Hender ................. | 180/65.2 |
| 4,651,066 A | * | 3/1987 | Gritter et al. ........... | 318/139 |
| 5,067,932 A | * | 11/1991 | Edwards ............... | 180/65.5 |
| 5,289,890 A | * | 3/1994 | Toyoda et al. .......... | 180/65.8 |
| 5,848,664 A | * | 12/1998 | Kaspar ................. | 180/308 |
| 5,879,265 A | * | 3/1999 | Bek ..................... | 180/65.6 |
| 5,947,855 A | * | 9/1999 | Weiss ................... | 180/65.2 |
| 6,349,782 B1 | * | 2/2002 | Sekiya et al. .......... | 180/65.2 |
| 7,150,340 B2 | * | 12/2006 | Beck et al. ............. | 180/65.8 |
| 7,169,077 B2 | * | 1/2007 | Laurent et al. ......... | 180/65.7 |
| 7,314,105 B2 | * | 1/2008 | Varela .................. | 180/65.6 |

* cited by examiner

*Primary Examiner*—Hau V Phan
(74) *Attorney, Agent, or Firm*—Robert W. Becker; Robert W. Becker & Assoc.

(57) ABSTRACT

An all-wheel drive motor vehicle having at least two wheel axles and comprising an electrical or hydraulic drive unit having a plurality of electric or hydraulic motors connected to an electrical or hydraulic energy source. Each motor is associated with a drive wheel and drives such wheel via a transmission. The motors that are associated with a given one of the wheel axles are adapted to be coupled with one another via a shiftable transverse locking device. At least one of the motors on a first side of the vehicle is adapted to be coupled, via a shiftable longitudinal locking device, with one of the motors associated with a different one of the wheel axles on the same side or on a second side of the vehicle.

16 Claims, 5 Drawing Sheets

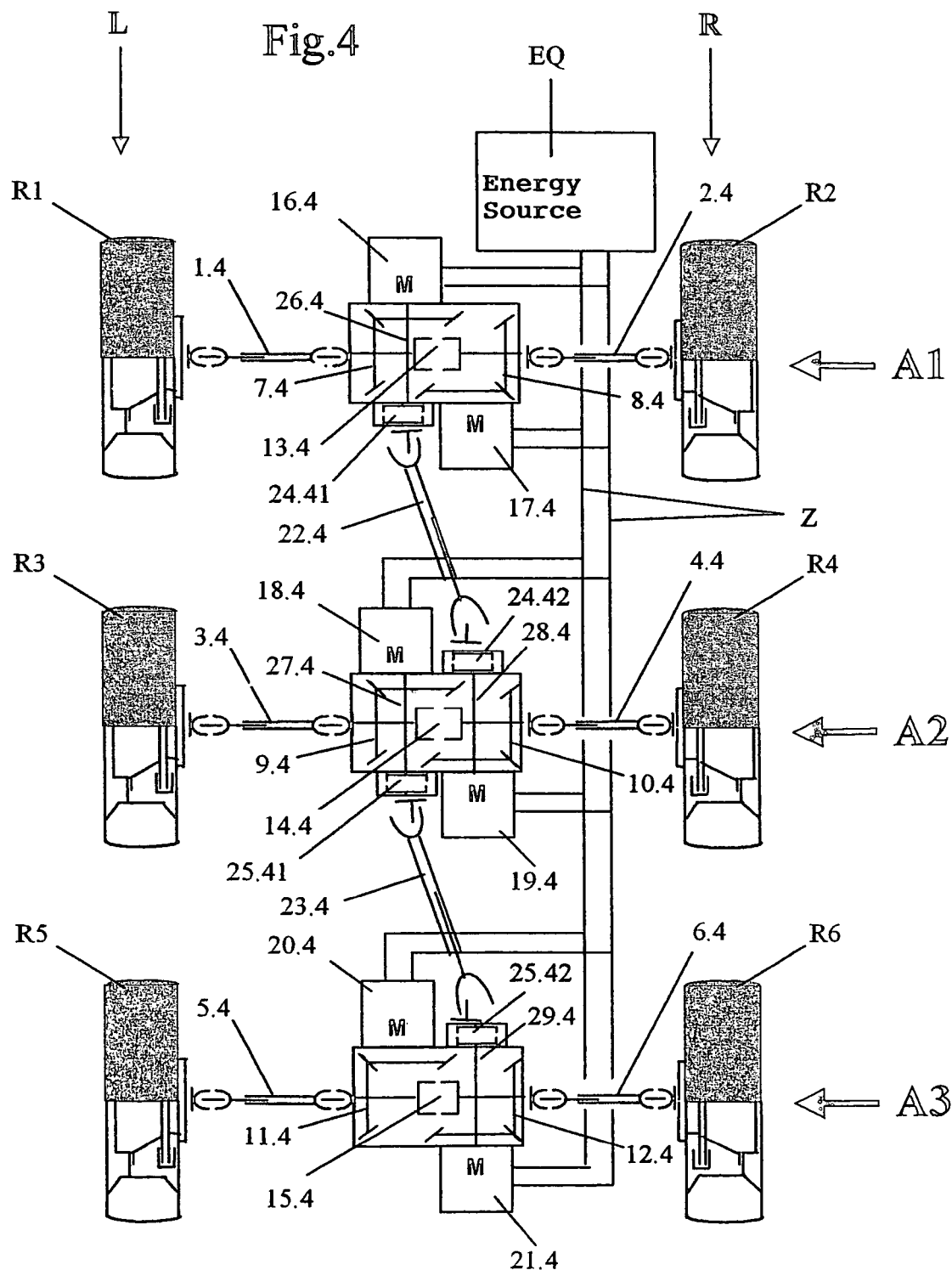

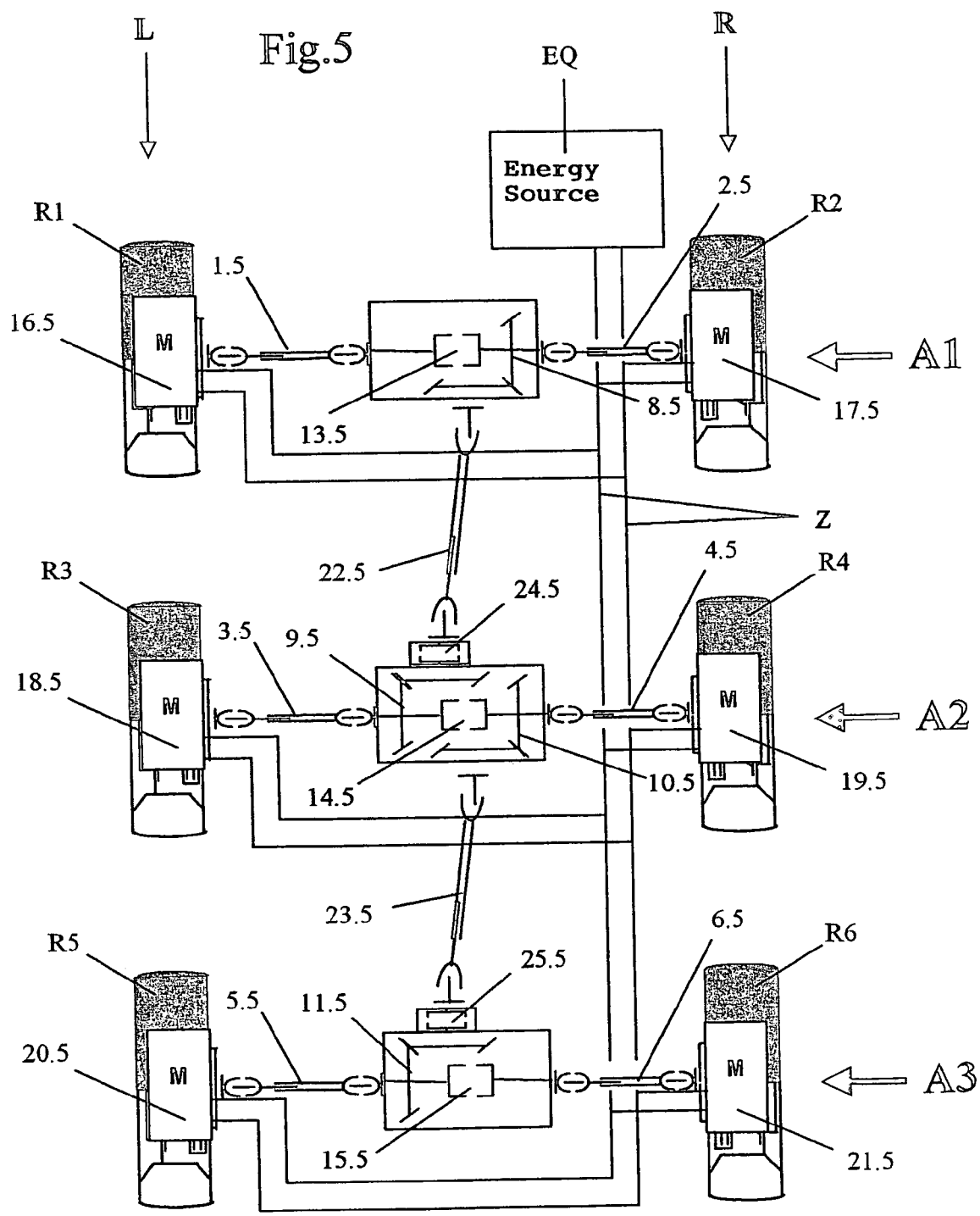

ALL-WHEEL DRIVE MOTOR VEHICLE

BACKGROUND OF THE INVENTION

The present invention relates to an all-wheel drive motor vehicle having at least two wheel axles and an electrical or hydraulic drive unit with a plurality of electric or hydraulic motors connected to an electrical or hydraulic energy source, each motor being associated with one of the drive wheels and driving such wheel via a transmission.

Motor vehicles of that kind are known. A motor vehicle of the aforementioned configuration that is configured as a hybrid vehicle with a diesel-electric drive unit is e.g. described, for example, in DE 101 21 372 A1.

Furthermore, motor vehicles that have a mechanical power train and moreover vehicles in which e.g. the front axle is driven mechanically whereas the rear axle is provided with an additional electric motor are generally known.

Motor vehicles with a mechanical power train have the disadvantage that turning the vehicle about its vertical axis is impossible [when the vehicle is standing] and that the power train cannot be configured in a flexible manner since the arrangement is predefined by the essential components.

Motor vehicles that have an electrical or hydraulic drive unit, thus e.g. vehicles in which the drive motors are located in the wheels, have the disadvantage that the individual motors have to be designed so as to be able to meet the maximal required performance regarding power and the torque, since each motor acts solely upon one wheel.

It is therefore an object of the present application to develop a motor vehicle of the aforementioned general type in such a way that turning is possible when the vehicle is standing and/or that the drive motors can be designed less powerful.

SUMMARY OF THE INVENTION

The object of the invention is realized by an all-wheel drive motor vehicle where the motors that are associated with a given one of the wheel axles can be coupled with one another by means of shiftable transverse locking means, wherein at least one of the motors on the first side of the vehicle can be coupled, via a shiftable longitudinal locking means, with one of the motors that is associated with a different one of the wheel axles on the same side of the vehicle or on a second side of the vehicle.

In the embodiment of the motor vehicle according to the invention, the advantages of a mechanical power train are combined with the advantages of an electrical or hydraulic single wheel drive. In general, the drive unit is comprised of single wheel drives, which, on every axle, can be coupled together via transverse locking means and which can be connected via universal joint shafts and longitudinal locking means so as to form a combined power train following the pattern of a locked mechanical power train. This system provides an electrical or hydraulic power train, which, although configured in a compact manner, allows the vehicle to surmount even extreme obstacles (slope/step). The motors can be designed less powerful, which affects the size and cost and also leads to more compact auxiliary systems (cooling, generator, power electronics).

Furthermore, the system enables a central parking brake or arresting means, which leads to advantages regarding space and weight. Unsprung masses are hence reduced and the emission of heat from the service brake is improved, due to a better oncoming flow against the brake disk and/or the service brake saddle.

The motor vehicle is equipped with the features of an single wheel drive, such as the turning about the vertical axis of the vehicle without a forward motion of the vehicle due to differing rotational speeds of the wheels and the active stabilization of the vehicle due to differing torques of the wheels.

Hence, the vehicle according to the invention is suitable for an off-road vehicle and especially for military applications.

The motor vehicle according to the invention requires at least two axles and can be designed for any number of axles. For a hybrid vehicle, a diesel aggregate that drives a generator or a hydraulic pump can be used as the source of electric energy. However, other sources of energy such as accumulators, batteries or fuel cells are possible.

Fundamentally, both form-locking and force-locking couplings, e.g. claw couplings, disk couplings, fluid couplings etc., can be used for the shiftable transverse locking means and the shiftable longitudinal locking means. They can also be used in a mixed arrangement.

BRIEF DESCRIPTION OF THE DRAWINGS

Embodiments of an all-wheel drive motor vehicle according to the invention are described below in more detail with the aid of the drawings, in which:

FIG. 4 shows a fourth embodiment of the power train in a representation analogous to FIG. 1, and FIG. 5 shows a fifth embodiment of the power train in a representation analogous to FIG. 1.

DESCRIPTION OF SPECIFIC EMBODIMENTS

In all of the drawings, the left side of the vehicle is labeled with L and the right side of the vehicle is labeled with R. Each drawing illustrates a power train comprising three axles, thus having a first axle A1, a second axle A2 and a third axle A3. The wheels R1 and R2 are associated with the first axle A1, the wheels R3 and R4 are associated with the second axle A2, and the wheels R5 and R6 are associated with the third axle A3.

All vehicles have an electrical or hydraulic source of energy EQ, which can be realized in different and known manners and is not described in further detail. The energy supply for the motors M of the drive unit is realized my means of the supply lines Z.

Figure 1:
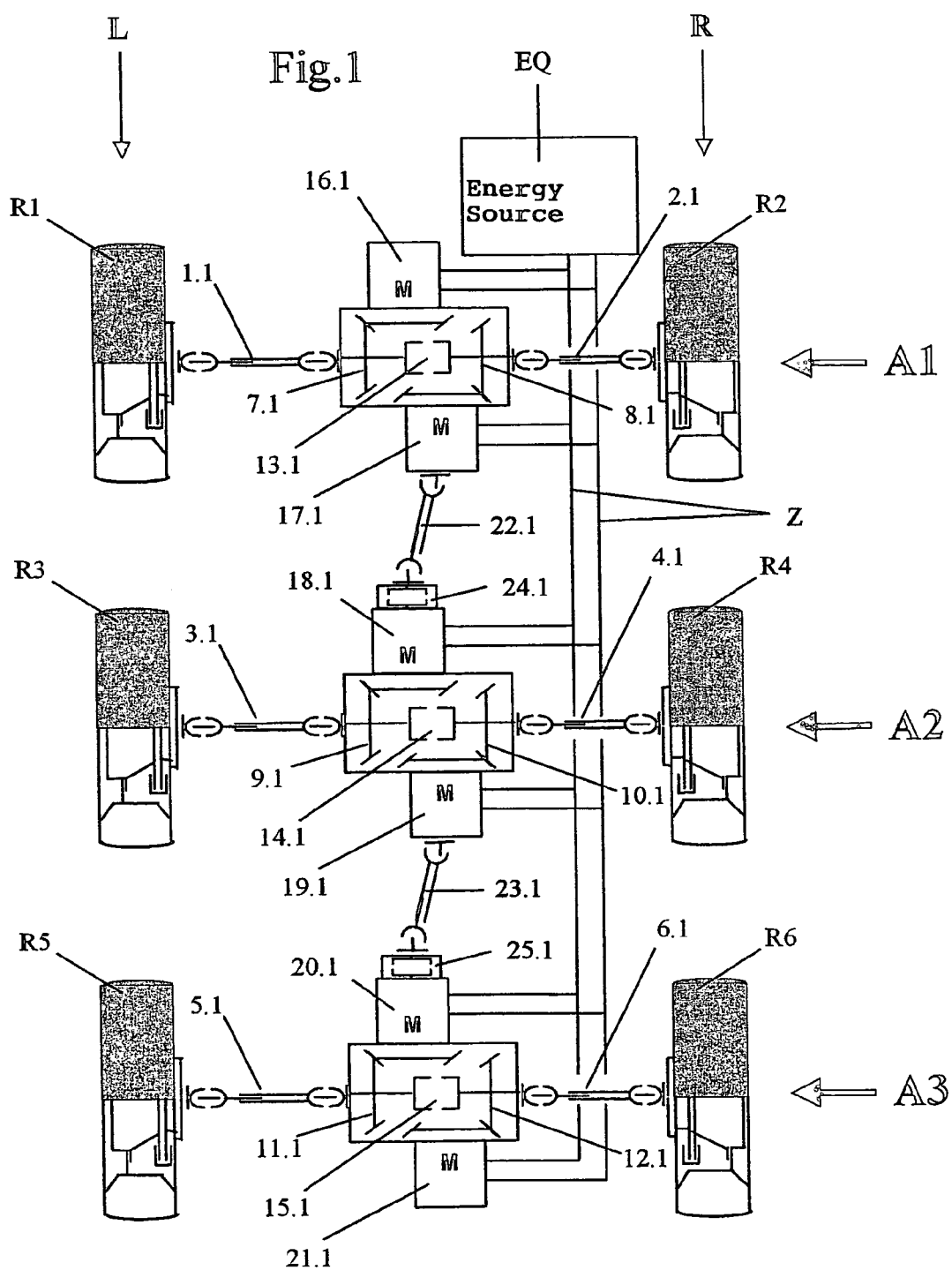
FIG. 1 shows a first embodiment of a power train of an all-wheel drive motor vehicle in a highly schematic plan view.

In the first embodiment of the power train represented in FIG. 1, the wheels R1 and R2 of the axle A1 are each connected to an associated transmission or gear unit 7.1 or 8.1, respectively, by means of the universal joint shafts 1.1 and 2.1 that extend transverse to the longitudinal direction of the vehicle. The transmissions 7.1 and 8.1 are disposed in a common housing that is located approximately on the longitudinal axis of the vehicle. The motors 16.1 and 17.1 are located on the transverse sides of the housing. The motor 16.1 drives the wheel R1 while the motor 17.1 drives the wheel R2. The two wheels R1 and R2 can be coupled with each other by means of a shiftable transverse locking means 13.1.

In an analogous manner, the wheels R3 and R4 of the axle A2 are connected to the motors 18.1 and 19.1 via the universal joint shafts 3.1 and 4.1 and the transmissions 9.1 and 10.1, respectively, and can be coupled with each other by means of the shiftable transverse locking means 14.1.

The wheels R5 and R6 of the axle A3 are connected to the motors 20.1 and 21.1 via the universal joint shafts 5.1 and 6.1 and the transmissions 11.1 and 12.1 and can be coupled with each other by means of the shiftable transverse locking means 15.1.

The motors 17.1, 18.1, 19.1 and 20.1 each have drive shafts that extend to both sides. One end of each drive shaft is connected to the associated transmission of the pertaining motor. The other end of the drive shaft of the motor 17.1 is coupled with one end of the drive shaft of the motor 18.1 via a universal joint shaft 22.1, which extends in the longitudinal direction of the vehicle, and via a shiftable longitudinal locking means 24.1. The other end of the drive shaft of the motor 18.1 drives the transmission 9.1. The other end of the drive shaft of the motor 19.1 is coupled with one end of the drive shaft of the motor 20.1 via a universal joint shaft 23.1, which extends in the longitudinal direction of the vehicle and via a shiftable longitudinal locking means 25.1. The other end of the drive shaft of the motor 20.1 drives the transmission 11.1.

The possibilities of coupling between the wheels and the axles of the power train can be seen directly in FIG. 1. If all the transverse locking means 13.1, 14.1 and 15.1 and each of the longitudinal locking means 24.1 and 25.1 are locked, all wheels and axles are coupled with each other. If all the transverse locking means 13.1, 14.1 and 15.1 and each of the longitudinal locking means 24.1 and 25.1 are unlocked, the result is a power train with single wheel drive. As the occasion demands, different intermediate shifting stages between these two states are possible.

Furthermore, in the locked position of all the transverse and longitudinal locking means, the application of a central parking brake or arresting means that affects all wheels is possible.

Figure 2:
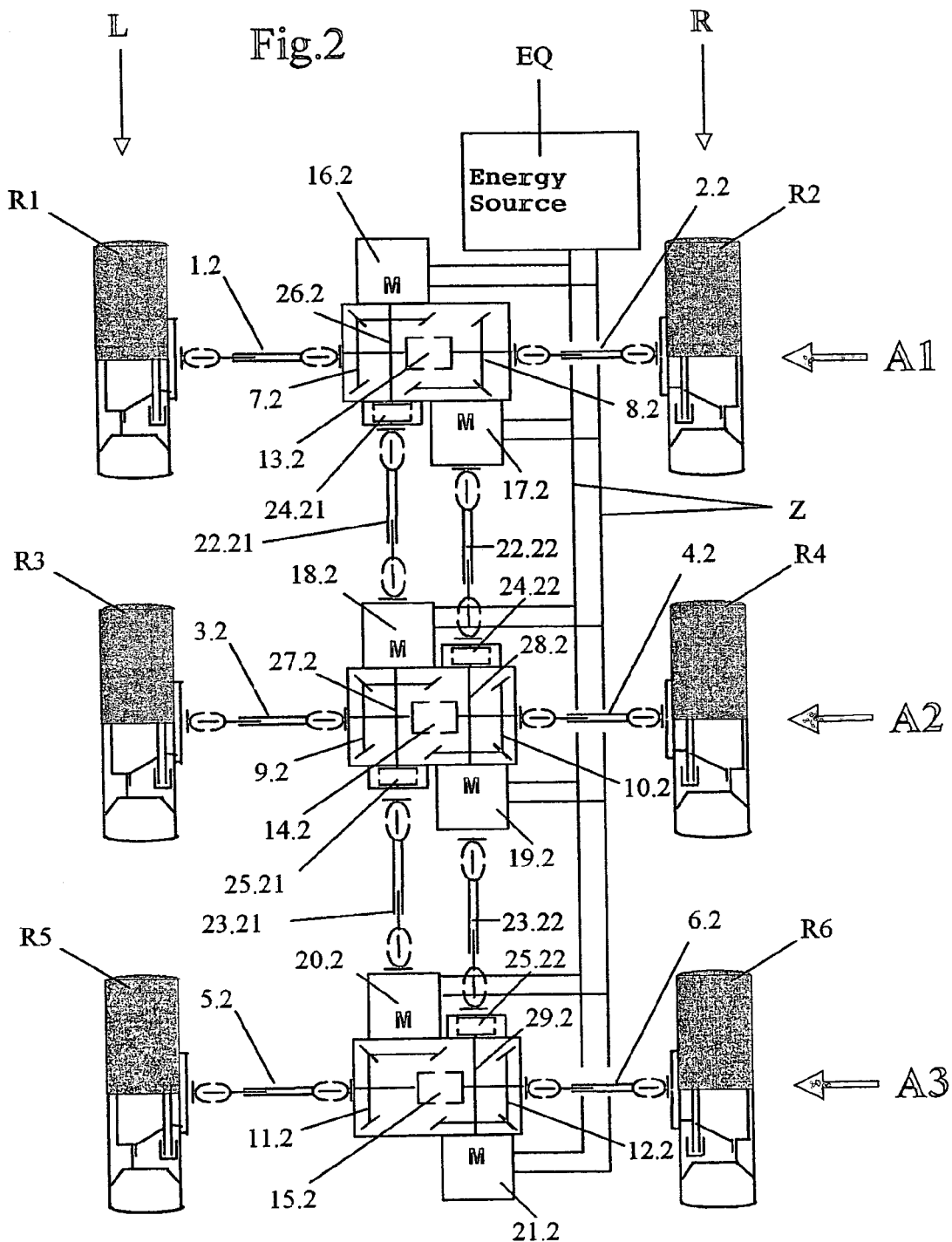
FIG. 2 shows a second embodiment of the power train in a representation analogous to FIG. 1.

In the embodiment according to FIG. 2, the wheels R1 and R2 of the axle A1 are connected to the transmissions 7.2 and 8.2, respectively, via the universal joint shafts 1.2 and 2.2 that extend transverse to the longitudinal direction of the vehicle. The wheels R1 and R2 can be coupled with each other via the shiftable transverse locking means 13.2. Likewise, the wheels R3 and R4 of the axle A2 are connected to the transmissions 9.2 and 10.2 via the universal joint shafts 3.2 and 4.2, respectively, and can be coupled with each other via the shiftable transverse locking means 14.2. The wheels R5 and R6 of the axle A3 are connected to the transmissions 11.2 and 12.2 via the universal joint shafts 5.2 and 6.2, respectively, and can be coupled with each other via the shiftable transverse locking means 15.2.

The difference of this embodiment in comparison with the embodiment described in conjunction with FIG. 1 is that the motors or drives of the wheels R1, R3 and R5 on the left side L of the vehicle and the motors of the wheels R2, R4 and R6 on the right side R of the vehicle can independently be coupled with each other.

On the left side of the vehicle L, the motor 16.2 can hence be coupled with the motor 18.2 via an additional shaft 26.2 that extends through the transmission 7.2, a shiftable longitudinal locking means 24.21 and via a universal joint shaft 22.21 that extends in the longitudinal direction of the vehicle. The motor 18.2 has a drive shaft that extends to both sides and can likewise be coupled with the motor 20.2 via an additional shaft 27.2 that extends through the transmission 9.2, a shiftable longitudinal locking means 25.21 and via a universal joint shaft 23.21 that extends in the longitudinal direction of the vehicle.

In the same manner, the motor 17.2 on the right side of the vehicle R can be coupled with the motor 19.2, which has a drive shaft that extends to both sides, via a universal joint shaft 22.22 that extends in the longitudinal direction of the vehicle and via a shiftable longitudinal locking means 24.22 and via an additional shaft 28.2 that extends through the transmission 10.2. The other end of the drive shaft of the motor 19.2 can be coupled with the motor 21.2 via a universal joint shaft 23.22 that extends in the longitudinal direction of the vehicle, via a shiftable longitudinal locking means 25.22 and via an additional shaft 29.2 that extends through the transmission 12.2.

This embodiment of the power train makes it possible to bring the torque of the three motors on one side of the vehicle onto the wheels on the same side, which can be advantageous when turning the vehicle about its vertical axis.

Figure 3:
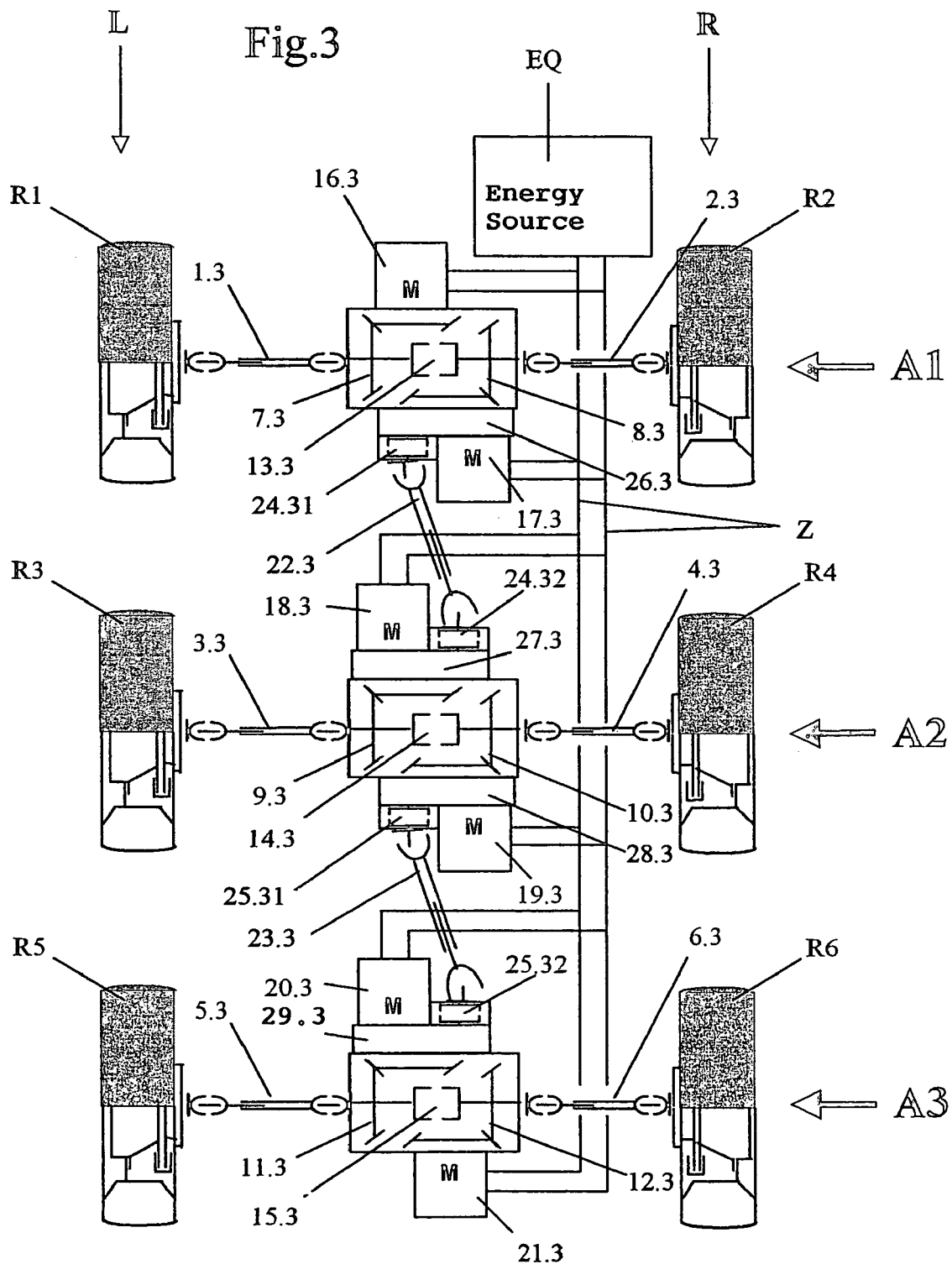
FIG. 3 shows a third embodiment of the power train in a representation analogous to FIG. 1.

In the embodiment represented in FIG. 3, the wheels R1 and R2 of the axle A1 are connected to the motors 16.3 and 17.3 via the universal joint shafts 1.3 and 2.3, which extend transverse to the longitudinal direction of the vehicle, and via the transmissions 7.3 and 8.3, respectively, and can be coupled with each other by means of the shiftable transverse locking means 13.3. The wheels R3 and R4 of the axle A2 are connected to the motors 18.3 and 19.3 via the universal joint shafts 3.3 and 4.3 and via the transmissions 9.3 and 10.3, respectively, and can be coupled with each other by means of the shiftable transverse locking means 14.3. The wheels R5 and R6 of the axle A3 are connected to the motors 20.3 and 21.3 via the universal joint shafts 5.3 and 6.3 and via the transmissions 11.3 and 12.3, respectively, and can be coupled with each other by means of the shiftable transverse locking means 15.3.

In this embodiment, in comparison with the embodiment described in conjunction with FIG. 1, the coupling in the longitudinal direction is realized in a different manner.

The motor 17.3 can be coupled with the motor 18.3 via an additional transmission 26.3, a shiftable longitudinal locking means 24.31, a universal joint shaft 22.3 that extends in the longitudinal direction of the vehicle, a shiftable longitudinal locking means 24.32 and a further additional transmission 27.3. The motor 19.3 can be coupled with the motor 20.3 via an additional transmission 28.3, a shiftable longitudinal locking means 25.31, a universal joint shaft 23.3 that extends in the longitudinal direction of the vehicle, a shiftable longitudinal locking means 25.32 and a further additional transmission 29.3. The shifting and operating possibilities are in principle the same as in the embodiment described in conjunction with to FIG. 1.

FIG. 4 shows another possible configuration of the power train. Here, the wheels R1 and R2 of the axle A1 are connected to the motors 16.4 and 17.4 via the universal joint shafts 1.4 and 2.4, which extend transverse to the longitudinal direction of the vehicle, and via the transmissions 7.4 and 8.4, respectively, and can be coupled with each other by means of the shiftable transverse locking means 13.4. The wheels R3 and R4 of the axle A2 are connected to the motors 18.4 and 19.4 via the universal joint shafts 3.4 and 4.4 and the transmissions 9.4 and 10.4, respectively, and can be coupled with each other by means of the shiftable transverse locking means 14.4. The wheels R5 and R6 of the axle A3 are connected to the motors 20.4 and 21.4 via the universal joint shafts 5.4 and 6.4 and the transmissions 11.4 and 12.4, respectively, and can be coupled with each other by means of the shiftable transverse locking means 15.4.

The motor 16.4 on the left side L of the vehicle can be coupled with the motor 19.4 via the additional shaft 26.4 that extends through the transmission 7.4, the shiftable longitudinal locking means 24.41, the universal joint shaft 22.4 that extends in the longitudinal direction of the vehicle, the shiftable longitudinal locking means 24.42 and the additional shaft 28.4 that extends through the transmission 10.4. The motor 18.4 on the left side L of the vehicle can be coupled with the motor 21.4 on the right side R of the vehicle via the additional shaft 27.4 that extends through the transmission 9.4, the shiftable longitudinal locking means 25.41, the universal joint shaft 23.4 that extends in the longitudinal direction of the vehicle, the shiftable longitudinal locking means 25.42 and the additional shaft 29.4 that extends through the transmission 12.4.

In this case, the coupling is realized without an additional transmission, that is to say by means of the additional shafts that are located in the top or bottom area of the transmissions. Again, the manners of operation are in principle the same as in the embodiment described in conjunction with FIG. 1.

FIG. 5 shows a slightly different configuration of the power train. In the embodiments according to FIGS. 1 through 4, the motors of the drive unit are arranged on both sides of and close to the longitudinal axis of the vehicle, whereas in the embodiment according to FIG. 5, the motors 16.5, 17.5, 18.5, 19.5, 20.5 and 21.5 that are associated with the wheels R1 through R6 are located in the wheel hubs and directly drive the associated wheel via a reduction gear.

The wheel R1 can be coupled with the wheel R2 via the universal joint shaft 1.5 that extends transverse to the longitudinal direction of the vehicle, the shiftable transverse locking means 13.5 and the universal joint shaft 2.5 that extends transverse to the longitudinal direction of the vehicle. The wheel R3 can be coupled with the wheel R4 via the universal joint shaft 3.5, the shiftable transverse locking means 14.5 and the universal joint shaft 4.5. The wheel R5 can be coupled with the wheel R6 via the universal joint shaft 5.5, the shiftable transverse locking means 15.5 and the universal joint shaft 6.5.

Furthermore, the wheel R2 and the motor 17.5 can be coupled with the wheel R3 and the motor 18.5 via the transmission 8.5, the universal joint shaft 22.5 that extends in the longitudinal direction of the vehicle, the shiftable longitudinal locking means 24.5 and the transmission 9.5. The wheel R4 and the motor 19.5 can be coupled with the wheel R5 and the motor 20.5 via the transmission 10.5, the universal joint shaft 23.5 that extends in the longitudinal direction of the vehicle the shiftable longitudinal locking means 25.5 and the transmission 11.5. The operating and shifting possibilities are the same as in the proceeding embodiments.

The specification incorporates by reference the disclosure of German priority document 10 2005 019 489.3 filed Apr. 27, 2005.

The present invention is, of course, in no way restricted to the specific disclosure of the specification and drawings, but also encompasses any modifications within the scope of the appended claims.

The invention claimed is:

1. An all-wheel drive motor vehicle having at least two wheel axles, comprising:

an electrical or hydraulic drive unit having a plurality of electric or hydraulic motors, connected to an electric or hydraulic energy source, wherein each motor is associated with a drive wheel and drives such wheel via a transmission, wherein the motors that are associated with a given one of said wheel axles are adapted to be coupled with one another via a shiftable transverse locking means, and wherein at least one of said motors on a first side of the vehicle is adapted to be coupled, via a shiftable longitudinal locking means, with one of said motors that is associated with a different one of said wheel axles on the same side of the vehicle or on a second side of the vehicle.

2. A motor vehicle according to claim 1, wherein each of said motors disposed on opposite sides of a longitudinal axis of the vehicle drives the associated wheel via a transmission and a universal joint shaft that extends transverse to the longitudinal axis of the vehicle, and wherein the transmissions associated with a given one of said wheel axles are disposed on opposite sides of the longitudinal axis of the vehicle and are adapted to be coupled with one another via said shiftable transverse locking means.

3. A motor vehicle according to claim 2, wherein said transmissions associated with a given one of said wheel axles, and said shiftable transverse locking means, are disposed within a common housing, and wherein said motors are disposed on outer walls of said housing that extend in a direction transverse to the longitudinal axis of the vehicle.

4. A motor vehicle according to claim 3, wherein at least one of said motors on one side of the vehicle is adapted to be coupled, via a universal joint shaft that extends in the direction of the longitudinal axis of the vehicle and a shiftable longitudinal locking means, with that motor that is disposed on the subsequent wheel axle and on the other side of the vehicle.

5. A motor vehicle according to claim 4, wherein coupling of the motor on one side of the vehicle with the motor of the subsequent wheel axle on the other side of the vehicle is effected via at least one additional transmission and at least one shiftable longitudinal locking means.

6. A motor vehicle according to claim 5, wherein said at least one additional transmission is disposed on said outer walls of said common housing, and wherein the motors are disposed on outer sides of the additional transmission.

7. A motor vehicle according to claim 4, wherein coupling of the motor on one side of the vehicle with the motor of the subsequent wheel axle on the other side of the vehicle is effected via additional shafts that are each guided through the transmission that is associated with that motor.

8. A motor vehicle according to claim 2, wherein at least one motor on one side of the vehicle is adapted to be coupled, via a universal joint shaft that extends in the direction of the longitudinal axis of the vehicle and a shiftable longitudinal locking means, with the motor that is disposed on the subsequent wheel axle and is on the same side of the vehicle.

9. A motor vehicle according to claim 8, wherein on both sides of the vehicle the motors that are associated with a given wheel axle are adapted to be coupled with the motors that are associated with the subsequent wheel axle.

10. A motor vehicle according to claim 8, wherein at least one of the motors that is adapted to be coupled with a motor of the subsequent wheel axle has a drive shaft that extends to both sides, wherein one end of said drive shaft is connected with the transmission of this motor, and wherein the other end of the drive shaft is connected via the universal joint shaft that extends in the direction of the longitudinal axis of the vehicle and said shiftable longitudinal locking means with a drive shaft of the subsequent or the preceding wheel axle.

11. A motor vehicle according to claim 10, wherein with at least one of the motors that is adapted to be coupled with a motor of the subsequent wheel axle, the connection of the drive shaft with the universal joint shaft that extends in the direction of the longitudinal axis of the vehicle and leads to the motor of the subsequent or preceding wheel axle is effected via an additional shaft that is guided through the transmission of this motor.

12. A motor vehicle according to claim 1, wherein said motors that are associated with said drive wheels are each disposed in wheel hubs thereof and drive the associated drive wheel directly or via a transmission, and wherein with at least one of said wheel axles the two motors thereof are respectively connected, via a universal joint shaft that extends in a direction transverse to the longitudinal axis of the vehicle, with a shiftable transverse locking means by means of which said motors are adapted to be coupled.

13. A motor vehicle according to claim 12, wherein at least one of said motors on one side of the vehicle is connected, via the universal joint shaft that extends in the direction transverse to the longitudinal axis of the vehicle and leads to the transverse locking means, with an intermediate transmission that is adapted to be coupled, via at least one shiftable longitudinal locking means and a universal joint shaft that extends in the direction of the longitudinal axis of the vehicle, as well as a further intermediate transmission, with a universal joint shaft that extends in the direction transverse to the longitudinal axis of the vehicle and leads to a motor of the subsequent wheel axle on the other side of the vehicle.

14. A motor vehicle according to claim 13, wherein said transverse locking means or said intermediate transmissions, or said transverse locking means and said intermediate transmissions, are disposed on or immediately adjacent to said longitudinal axis of said vehicle.

15. A motor vehicle according to one of the claim 1, wherein said shiftable transverse locking means or said shiftable longitudinal locking means, or said shiftable transverse locking means and said shiftable longitudinal locking means, are embodied as couplings that operate in a force-locking manner.

16. A motor vehicle according to claim 1, wherein said shiftable transverse locking means and/or said shiftable longitudinal locking means are embodied as couplings that operate in a force-locking manner.

* * * * *